3,271,331
PHENOLIC FOAMS STABILIZED BY SILOXANE-OXYALKYLENE COPOLYMERS
Hans H. Ender, Buffalo, N.Y., assignor to Union Carbide Corporation, a corporation of New York
No Drawing. Filed Oct. 10, 1963, Ser. No. 315,352
18 Claims. (Cl. 260—2.5)

This invention relates to phenolic foams and, in particular, to foamed phenol-aldehyde resole resins stabilized by certain organosilicon compounds.

Two types of phenolic resins are widely known, i.e. phenolic novolac resins and phenolic resole resins. Because they are relatively cheap and possess good physical properties, such as good tensile, flexural and compressive strengths, the desirability of producing foamed products from resole resins has been long recognized. However, the foamed resole resins provided to date have not been entirely satisfactory since they tend to be anisotropic.

Accordingly, it is an object of this invention to provide isotropic foamed resole resins.

Other objects of this invention will be apparent from the following description thereof.

This invention is based, in part, on the discovery that isotropic foamed phenol-aldehyde resole resins can be produced by incorporating in the resole resin, prior to its conversion to a foam, a minor amount of a siloxane-oxyalkylene copolymer wherein the siloxane moiety is linked to the oxyalkylene moiety by a silicon to carbon bond.

The siloxane-oxyalkylene copolymers that are useful in this invention contain at least two siloxane groups that are represented by the formula:

$$R_b SiO_{\frac{4-b}{2}} \quad (1)$$

wherein R is a monovalent hydrocarbon group or a divalent organic group (e.g. a divalent hydrocarbon group, a hydroxy-substituted divalent hydrocarbon group or a divalent hydrocarbon group linked to a carbonyl group) attached to the silicon atom by a carbon to silicon bond, and $b$ has a value from 1 to 3 inclusive. The groups represented by R can be the same or different in any given siloxane group or throughout the siloxane portion of the copolymer, and the value of $b$ in the various siloxane groups in the siloxane portion of the copolymer can be the same or different. The divalent organic groups represented by R link the siloxane portion of the copolymer to the oxyalkylene portion of the copolymer. Each siloxane block contains at least one group represented by Formula 1 wherein at least one group represented by R is a divalent organic group. The siloxane portion of the copolymer has a ratio of hydrocarbon groups to silicon atoms from 1:1 to 3:1.

Illustrative of the monovalent hydrocarbon groups that are represented by R in Formula 1 are the alkenyl groups (for example, the vinyl and the allyl group); the cycloalkenyl groups (for example, the methyl, ethyl, isopropyl, octyl and dodecyl groups); the aryl groups (for example, the phenyl and naphthyl groups); the aralkyl groups (for example, the benzyl and the phenylethyl groups); the alkaryl groups (for example, the styryl, tolyl and n-hexylphenyl groups), and the cycloalkyl groups (for example, the cyclohexyl group).

Illustrative of the divalent hydrocarbon groups represented by R in Formula 1 are the alkylene groups (such as the methylene, ethylene, propylene, butylene, 2,2-dimethyl-1,3-propylene and decylene groups), the arylene groups (such as the phenylene and p,p'-diphenylene groups), and the alkarylene groups (such as the phenylethylene group). Preferably, the divalent hydrocarbon group is an alkylene group containing from two to four successive carbon atoms. Siloxane groups containing divalent hydrocarbon groups as substituents are illustrated by groups having the formulae:

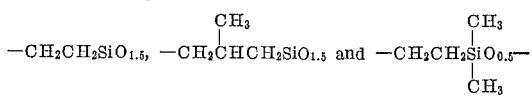

These divalent hydrocarbon groups are linked to a silicon atom of the siloxane chain of the copolymer by a silicon-to-carbon bond and to an oxygen atom of the oxyalkylene chain of the copolymer by a carbon-to-oxygen bond. Other divalent organic groups represented by R are described hereinbelow.

The copolymers useful in this invention can contain siloxane groups represented by Formula 1 wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenylsiloxy, phenylethylmethylsiloxy and ethylvinylsiloxy groups). These copolymers can contain one or more types of siloxane groups that are represented by Formula 1 provided that at least one group has at least one divalent hydrocarbon substituent. By way of illustration, only ethylenemethylsiloxy groups

can be present in the siloxane block or the copolymer can contain more than one type of siloxane group, e.g., the copolymer can contain both ethylenemethylsiloxy groups and diphenylsiloxy groups, or the copolymer can contain ethylenemethylsiloxy groups, diphenylsiloxy groups and the diethylsiloxy groups. The copolymers useful in the compositions of this invention can contain trifunctional siloxane groups (e.g., monomethylsiloxane groups, $CH_3SiO_{1.5}$), difunctional siloxane groups (e.g., dimethylsiloxane groups, $(CH_3)_2SiO$—), monofunctional siloxane groups (e.g., trimethylsiloxane groups $$(CH_3SiO_{0.5})$$

or combinations of these types of siloxane groups having the same or different substituents. Due to the functionality of the siloxane groups, the copolymer can be predominantly linear or cyclic or cross-linked or it can have combinations of these structures.

The siloxane portion of the copolymers useful in the compositions of this invention can contain organic end-blocking or chain terminating organic groups, in addition to the monofunctional siloxane chain terminating groups encompassed by Formula 1. By way of illustration, the siloxane portion can contain such organic end-blocking groups as the hydroxyl group, the aryloxy groups (such as the phenoxy group), the alkoxy groups (such as the methoxy, ethoxy, propoxy and butoxy groups), the acyloxy groups (such as the acetoxy group), and the like. The siloxane portion of the copolymers useful in the compositions of this invention contain at least two siloxane groups that are represented by Formula 1. Preferably, the siloxane blocks contain a total of from five to twenty siloxane groups that are represented by Formula 1.

The siloxane portion of the copolymers useful in this invention can contain, in addition to the groups represented by Formula 1, siloxane groups represented by the formula:

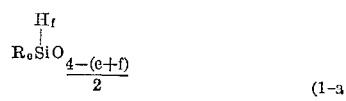

wherein R has the meaning defined in Formula 1, $e$ has a value from 0 to 2, $f$ has a value from 1 to 2 and $(e+f)$ has a value from 1 to 3, inclusive.

The oxyalkylene portion of the copolymers employed in the compositions of this invention each contain at least one oxyalkylene group represented by the formula:

$$[-R'O-] \quad (2)$$

wherein R' is an alkylene group. Illustrative of the oxyalkylene groups that are represented by Formula 2 are the oxyethylene, oxypropylene, oxy-1,4-butylene, oxy-1,5-amylene, oxy-2,2-dimethyl-1,3-propylene, oxy-1,10-decylene groups and the like. The oxyalkylene portion of the copolymers can contain one or more of the various types of oxyalkylene groups represented by Formula 2. By way of illustration, the oxyalkylene blocks can contain only oxyethylene groups or only oxypropylene groups or both oxyethylene and oxypropylene groups, or other combinations of the various types of oxyalkylene groups represented by Formula 2.

The oxyalkylene portion of the copolymers employed in the compositions of this invention can contain various organic end-blocking or chain terminating groups. By way of illustration, the oxyalkylene blocks can contain such end-blocking groups as the hydroxy group, the aryloxy group (such as the phenoxy group), the alkoxy groups (such as the methoxy, ethoxy, propoxy and butoxy groups), alkenyloxy groups (such as the vinyloxy and the allyloxy groups). Also, a single group can serve as an end-blocking group for more than one oxyalkylene chain. For example, the glyceroxy group,

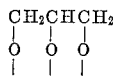

can serve as an end-bocking group for three oxyalkylene chains. Trihydrocarbylsiloxy groups (e.g. trimethylsiloxy groups) can also end-block the oxyalkylene chains.

The oxyalkylene chains in the copolymers useful in the compositions of this invention each contain at least one oxyalkylene group represented by Formula 2. Preferably, each oxyalkylene chain contains from four to thirty of such groups. Provided that each oxyalkylene block contains at least one oxyalkylene group represented by Formula 2, the number of oxyalkylene groups and that part of the average molecular weight of the copolymer that is attributable to the oxyalkylene blocks is not critical.

The copolymers useful in the compositions of this invention can contain siloxane groups and oxyalkylene groups in any relative amount. In order to possess desirable properties, the copolymer should contain from 5 parts by weight to 95 parts by weight of siloxane groups and from 5 parts by weight to 95 parts by weight of oxyalkylene groups per 100 parts by weight of the copolymer. Preferably, the copolymers contain 5 parts by weight to 50 parts by weight of the siloxane groups and from 50 parts by weight to 95 parts by weight of the oxyalkylene groups per 100 parts by weight of the copolymer.

The following classes of compounds are among the siloxane-oxyalkylene block copolymers useful in the formulations of this invention.

(A) Copymers that contain at least one unit that is represented by the formula:

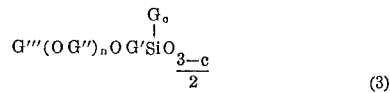

(B) Copolymers that contain at least one unit that is represented by the formula:

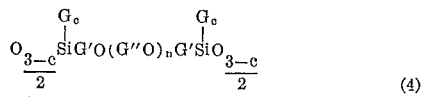

(C) Copolymers that contain at least one unit that is represented by the formula:

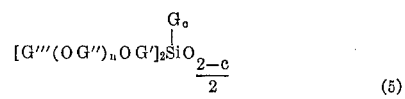

In the above Formulas 3, 4 and 5, G is a monovalent hydrocarbon radical, G' is a divalent hydrocarbon radical, G'' is an alkylene radical containing at least two carbon atoms, G''' is a hydrogen atom or a monovalent hydrocarbon radical free of aliphatic unsaturation and $n$ has a value of at least four and $c$ has a value from 0 to 2 in Formulas 3 and 4 and a value from 0 to 1 in Formula 5. In Formulas 3, 4 and 5, G can represent the same or different radicals, $n$ preferably has a value from 4 to 30 inclusive and G'' can represent the same or different radicals, i.e., the group $(OG'')_n$ can represent, for example, the groups: $-(OC_2H_4)_p-$, $-(OC_2H_4)(OC_3H_6)_q-$, $-(OC_3H_6)_p(OC_8H_{16})_q-$, where $p$ and $q$ are integers having a value of at least one.

The monovalent hydrocarbon radicals represented by G in Formulas 3, 4 and 5 can be saturated or olefinically unsaturated or can contain benzenoid unsaturation. Illustrative of the monovalent hydrocarbon radicals represented by G are the linear aliphatic radicals (e.g., the methyl, ethyl and decyl radicals), the cycloaliphatic radicals (e.g., the cyclohexyl and the cyclopentyl radicals), the aryl radicals (e.g., the phenyl, tolyl, xylyl and naphthyl radicals), the aralkyl radicals (e.g., the benzyl and beta-phenylethyl radicals), the unsaturated linear aliphatic radicals (e.g., the cyclohexenyl radical).

Preferably, the G and G' groups [included in the definition of R in Formulas 1 and 1-a above] contain from one to about twelve carbon atoms and the G'' groups [included in the definition of R' in Formula 2 above] contain from two to about ten carbon atoms. When the G''' group is a monovalent hydrocarbon radical free of aliphatic unsaturation it preferably contains from one to about twelve carbon atoms.

Illustrative of the divalent hydrocarbon radicals represented by G' in Formulas 3, 4 and 5 are the alkylene radicals (e.g., the methylene, ethylene, 1,3-propylene, 1,4-butylene and 1,12-dodecylene radicals), the arylene radicals (e.g., the penylene radical) and the alkarylene radicals (e.g., the phenylethylene radicals). In Formulas 3, 4 and 5, G' is preferably an alkylene radical containing at least two carbon atoms.

Illustrative of the alkylene radicals containing at least two carbon atoms represented by G'' in Formulas 3, 4 and 5 are the ethylene, 1,3-propylene, 1,6-hexylene, 2-ethylhexylene-1,6- and 1,12-dodecylene radicals.

Illustrative of the radicals represented by G''' in Formulas 3, 4 and 5 are the saturated linear or branched chain aliphatic hydrocarbon radicals (e.g., the methyl, ethyl, propyl, n-butyl, tert-butyl and decyl radicals), the saturated cycloaliphatic hydrocarbon radicals (e.g., the cyclopentyl and cyclohexyl radicals), the aryl hydrocarbon radicals (e.g., the phenyl, tolyl, naphthyl and xylyl radicals), and the aralkyl hydrocarbon radicals (e.g., the benzyl and beta-phenylethyl radicals).

A preferred class of siloxane-oxyalkylene copolymers that are useful in this invention are those which are composed of from 1 to 99 mol percent (or preferably from 10 to 90 mol percent) of groups represented by the Formulas 3, 4 or 5 and from 1 to 99 mol percent (preferably from 10 to 90 mol percent) of groups represented by the formula

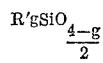

wherein R' is a monovalent hydrocarbon group as defined above for R and $g$ has a value from 1 to 3 inclusive. The following are representative of the latter class of siloxane-oxyalkylene copolymers useful in the invention. In the formulas, "Me" represents the methyl group $(CH_3-)$, and "Bu" represents the butyl group $(C_4H_9-)$.

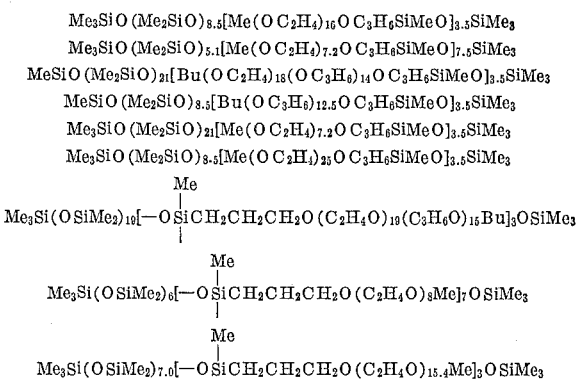

Siloxane-oxyalkylene copolymers that are especially suited for use in this invention are those having the formula:

$$Me_3SiO(Me_2SiO)_m[R''(OC_2H_4)_x(OC_3H_6)_yO(CH_2)_zSiO\text{—}]_nSiMe_3 \mid Me$$

wherein $m$ has a value from 3 to 25 inclusive, $n$ has a value from 2 to 10 inclusive, $x$ has a value from 4 to 25 inclusive, $y$ has a value from 0 to 25 inclusive, $z$ has a value from 2 to 3 inclusive and $R''$ is an alkyl group containing from 1 to 4 carbon atoms inclulsive.

Another class of siloxane-oxyalkylene copolymers that are useful in this invention are those represented by the formula:

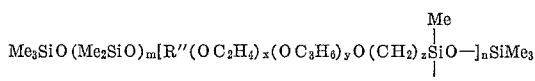

in which group

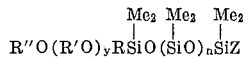

constitutes between 5 to 60% of the total weight of the copolymer, the groups $(R'O)_y$ together constituting at least 25% by weight of the copolymer and in which the combined weights of—

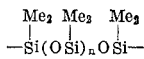

are not less than 50% of the total weight of the copolymer. In this formula, $R''$ is a hydrogen atom or a hydrocarbyl, hydrocarbonoxy, acyl, trihydrocarbylsilyl or monovalent hydrocarbon carbamyl radical; $R'$ is an alkylene radical having from 2 to 4 carbon atoms; $y$ is a whole number from 4 to 2,000; $R$ is a divalent non-aromatic hydrocarbon radical, divalent non-aromatic hydroxy-substituted hydrocarbon radical, divalent non-aromatic acyl radical derived from a monocarboxylic acid or a divalent non-aromatic hydroxy ether radical; $R$ is connected to the silicon via a silicon-carbon bond; $n$ is equal to 0 or a positive whole number; and $Z$ is a hydrocarbyl radical, a hydrocarbonoxy radical (i.e., $R(OR')_yOR''$ in which, $R$, $R'$, $y$ and $R''$ are as defined above) or of a radical of the formula $—ASiB_3$ in which $A$ is a divalent hydrocarbon radical and $B$ is a hydrocarbyl or a trihydrocarbylsiloxy radical. Typical of this class of copolymers are those having the formulae:

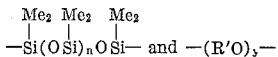

A further class of siloxane-oxyalkylene copolymers that are useful in this invention are those containing in the group represented by the formula:

in which $R''$ is a hydrogen atom or a monovalent hydrocarbonoxy radical, monovalent hydrocarbon radical, monovalent halohydrocarbon radical or a monovalent halohydrocarbonoxy radical; $y$ has a value from 0 to 3; $R$ is a divalent radical attached to the silicon through a silicon-carbon bond (e.g. a divalent hydrocarbon radical, divalent halohydrocarbon radical or a divalent radical composed of carbon, hydrogen and oxygen in the form of ether linkages); $n$ has a value from 1 to 2; $n$ being 1 when the C of the $CH_n$ group is linked directly to R in a cycloaliphatic ring; $R'$ is an alkylene group of 2 to 4 inclusive carbon atoms; $m$ is an integer of at least 1; and $B$ is a hydrogen atom or a monovalent hydrocarbon radical, a monovalent hydrocarbonoxy radical or a monovalent halohydrocarbon radical. Typical of this class of copolymers are those having the formulae:

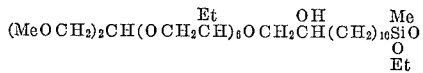

and

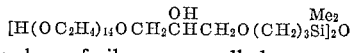

Another class of siloxane-oxyalkylene copolymers useful in this invention are those wherein the siloxane moiety is linked to an oxyalkylene moiety by a divalent group composed of a divalent hydrocarbon group linked to a carbonyl group. Such copolymers are illustrated by those containing a unit having the formula:

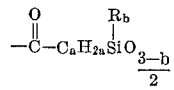

where $R$ is a monovalent hydrocarbon radical or a halogenated monovalent hydrocarbon radical, $a$ is an integer of from 2 to 10, and $b$ is an integer of from 0 to 2. The unsatisfied valence of the acyl carbon atom ($—CO—$) is attached through an oxygen linkage to a polyoxyalkylene chain. Typical copolymers of this class are those having the formulae:

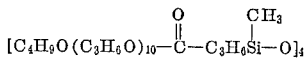

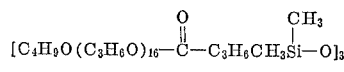

and

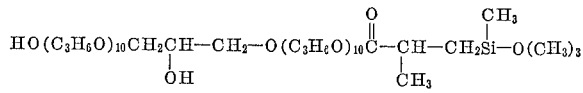

Various of the above-described classes of siloxane-oxyalkylene copolymers are described in U.S. Patents 3,057,901; 2,846,458; and 2,868,824, in Belgian Patent No. 603,552 and in U.S. patent application 61,356, filed October 10, 1960, now Pat. No. 3,168,543.

The amount of the above-described siloxane-oxyalkylene copolymers employed in this invention is not narrowly critical. In general, from 1 part to 10 parts by weight of the copolymer per 100 parts by weight of the phenol-aldehyde resole resin are useful but from 2 parts to 6 parts by weight per 100 parts by weight of the resole resin are preferred. Other relative amounts of the copolymer and the resole resin can be employed but generally no commensurate advantage is gained thereby.

This invention provides mixtures of phenol-aldehyde resole resins and the above-described siloxanes-oxyalkylene copolymers which can be stored without deterioration or reaction for relatively long periods of time (particularly if refrigerated or mixed with suitable solvents or diluents) prior to conversion to foamed products.

The resole resins employed in this invention are the reaction products of a phenol and an aldehyde. Usually from about 1.1 to 3 mols of the aldehyde per mole of the phenol (preferably from 1.5 to 2.5 mols of the aldehyde per mol of the phenol) are employed in producing suitable resole resins. Typical of the phenols that are useful in producing suitable resole resins are those represented by the formula:

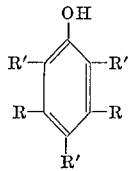

wherein at least two groups represented by R' are hydrogen atoms and the groups represented by R and any remaining group represented by R' are hydrogen atoms or groups which do not impede the condensation of the phenol with an aldehyde (e.g., a substituent such as a halogen atom or a hydroxy, alkyl or aryl group). Illustrative of suitable phenols are phenol, cresols (particularly m-cresol), xylenols (particularly 3,5-xylenol) and dihydroxybenzenes (particularly resorcinol). Typical of the aldehydes that are useful in producing suitable resole resins are formaldehyde (including the oligomers and polymers of formaldehyde such as trioxane), furfural, sugars and cellulose hydrolyzates. Such aldehydes can be employed as such or dissolved in suitable solvents such as aqueous alcohols (e.g., aqueous methanol, n-propanol, isobutanol or n-butanol). The reaction of the phenol and the aldehyde is conducted in the presence of a basic catalyst such as ammonia, sodium hydroxide, potassium hydroxide or barium hydroxide in an amount of from 0.1 to 0.001 mole of catalyst (or preferably from 0.05 to 0.002 mol of catalyst) per mole of the phenol. The resulting resole resin is usually not separated from the residual catalyst which is often advantageously used to affect the final cure of the resole resin. The resole resin is generally a liquid.

The resole resins used in this invention are usually not highly polymerized so that they are normally liquid and generally water-soluble. This is often referred to as the "A" stage of resinification as distinguished from the "C" stage which is the fully cured thermoset resin stage. As the condensation between the phenol and aldehyde progresses from the liquid low molecular weight resins, the molecular weight of the condensation product increases and the resin exhibits a corresponding increase in viscosity. Advantages are also made of mixtures of several different resole resins in order to control the initial viscosity and reactivity of the foamable compositions. For example, mixtures of a high viscosity and a low viscosity resin have been used to control the ultimate density of the foam. Similarly, mixture of a liquid and a solid resole can be employed to the same effect. It is contemplated in the invention that any resole resin either initially liquid or made fluid by the addition of any agent or by any techniques can be employed in this invention.

In accordance with the practice of the present invention, a foamed phenol-aldehyde resole resin is produced by curing and foaming a mixture containing a phenol-aldehyde resole resin and a siloxaneoxyalkylene copolymer of the type described hereinabove. The curing of such mixtures is accomplished by producing cross-links in the resole resin and such cross-links can be produced either by employing highly reactive phenols or by employing other cross-linking compounds. Illustrative of such highly reactive phenols arre m-cresol, 3,5-xylenol, dihydroxybenzenes (particularly resorcinol) and trihydroxybenzenes (particularly phloroglucinol). Other cross-linking compounds include the arylene diisocyanates (particularly 2,4-tolylene diisocyanate, 3,6-tolylene diisocyanate, 3,3'-bitolylene-4,4'-diisocyanate, 3,3'-dimethyl-diphenylmethane 4,4'-diisocyanate, and diphenylmethane-4,4' - diisocyanate); polyisocyanate - containing reaction products of arylene diisocyanates and polyhydroxy compounds (particularly reaction products of the aforementioned arylene diisocyanates and dihydroxy end-blocked polyethylene oxide, dihydroxy end-blocked polypropylene oxide, dihydroxy end-blocked ethylene-propylene oxide copolymers, ethylene glycol, polyethylene glycol, propylene glycol, polypropylene glycol, propane and butane diol, pentyl and neopentyl glycol, hexanediol, butyn diol, trimethylol propane, glycerol, hexanetriol, pentaerythritol and its polymers, anhydroenneaheptitol, sorbitol and mannitol); divinyl sulfone; aldehydes (particularly dimethyl acetone); and ketones (particularly acetone, methylethylacetone and cyclohexanone). Particularly good results are obtained employing the aforementioned arylene diisocyanates and reaction products thereof with polyhydroxy compounds as cross-linking compounds. The amount of such cross-linking compounds employed is not narrowly critical and generally from 0.2 to 10 weight percent of the cross-linking compound based on the weight of the resole resin are preferred. The use of the aforementioned cross-linking compounds converts the resole resin initially to a highly viscous or semi-rubbery state thereby facilitating the entrapment of the gas bubbles produced within the resin during curing.

When divinyl sulfone and ketones are employed as cross-linking compounds in the practice of this invention, it is preferable to employ a basic catalyst to affect the cure. From 1 to 5 weight percent of triethylamine or pyridine (based on the weight of the resole resin) are generally effective for this purpose. The use of arylene diisocyanates and the polyisocyanate-containing reaction products of such arylene diisocyanates and polyhydroxy compounds is preferred since such compounds allow for the production of gas within the resole resin at temperatures below 100° C. These cross-linking compounds also permit the production of foams having small, uniformly dispersed cells. In producing such reaction products, an excess of the arylene diisocyanate is employed to insure that the reaction product contains at least two isocyanate groups per molecule. Apparently these arylene diisocyanates and polyisocyanate-containing reaction products not only affect cross-linking, but also react to produce carbon dioxide which serves to seed formation of bubbles of gas by the resole resin. In addition, the isocyanate groups of such cross-linking compounds can react with any water present in the mixture to produce biurets and allophanates.

The phenol-aldehyde resole resins employed in the practice of this invention usefully contain residual basic catalysts. These catalysts can be employed in the curing and foaming of these resole resins. If desired, additional catalysts can also be employed in order to accelerate the cure. Suitable catalysts include the alkali hydroxides and the alkali earth hydroxides, primary, secondary and tertiary amines (such as ethylene diamine, diethylene triamine, phenylene diamine, piperizine, triethylamine, triphenylamine and tribenzylamine), tertiary phosphines (such as triphenylphosphine), and alkyl and alkoxy silicon, titanium zirconium and tin compounds (such as tetraethylsilicate, silyl-tetra-formyl, tetra-butyl-titanate, tetra-butyl-zirconate and dibutyltin dilaurate). The aforementioned polyamine curing catalysts (e.g., ethylene diamine) can also function as cross-linking compounds. When it is desired to cure the resole resin at about room temperature, Friedel-Crafts catalysts can be advantageously employed. Such Friedel-Crafts catalysts include the anhydrous tetrachlorides of titanium, zirconium and tin as well as compounds produced by replacing one or two of the chlorine atoms of such chlorides with hydrocarbyl groups (e.g., aryl or alkyl groups) and phosphorus chlorides and oxy chlorides (such as $PCl_3$, $PCl_5$ and $POCl_3$)

and analogous bromides. The Friedel-Crafts catalysts can be employed as such or in a form of complexes thereof with ethers, amines or phenols. In either event, the Friedel-Crafts catalyst is employed in an anhydrous condition. A particularly preferred class of catalysts for effecting the cure of the resole resin at room temperature are the hydrocarbyltrichlorosilanes represented by the formula $RSiCl_3$ wherein R is a hydrocarbyl group (e.g., an alkyl or aryl group) containing from 1 to 20 carbon atoms. Such silanes include methyltrichlorosilane, ethyltrichlorosilane, amyltrichlorosilane, phenyltrichlorosilane and nonyltrichlorosilane. It is sometimes desirable to reduce the activity of the aforementioned Friedel-Crafts catalysts and silicon catalysts. Such is conveniently accomplished by dissolving or dispersing the catalysts in a suitable liquid organic compound such as the dimethylether or ethylene glycol, chlorotrifluoromethane, methylenedichloride, diethyl ether or diisopropyl ether. Such solvents may aid in the foaming of the resole resin by evaporating during curing. Generally, solutions containing from 10 to 200 parts by weight of the catalyst dissolved in 100 parts by weight of the solvent are preferred. In general, it is preferable that the total amount of the curing catalyst present be in the range of from 0.2 to 5 weight percent based on the weight of the resole resin.

When catalysts are employed which may react with any water present to produce acids (e.g., Friedel-Crafts catalysts or hydrocarbylchlorosilane catalysts), materials can be added to the reaction mixture to neutralize such acids. Suitable materials of this type are alkylene oxides (particularly ethylene oxide and propylene oxide), sodium sulfite and sodium nitrite. The alkylene oxide and the sodium nitrite perform the additional function of producing gas and thereby aiding in the production of the foam. Moreover, the alkylene oxides function as plasticizers and the sodium nitrite functions as a corrosion inhibitor.

Various modifiers can be employed in the practice of this invention to impart additional desirable properties to the resole foam and particularly to increase the elasticity of the foam and to decrease even further its friability. Such modifiers include polyamines (such as ethylene diamine and propylene diamine), glycols (such as ethylene glycol and propylene glycol), triols (such as pentaerythritol and hexanetriol), sorbitol, enneaheptitol, polyethylene glycols, polyvinyl alcohol, polyvinyl pyrrolidone, polyvinyl formal, polyvinyl butyral, hydroxy cellulose and epoxides (particularly the diglycidyl ethers of bisphenols). These modifiers can be employed in the form of solutions thereof in suitable solvents such as phenol or cresol. The epoxides are particularly valuable modifiers since they produce particularly strong foams and, when a polyamine or a polyamine carbonate is used as a blowing agent and/or as a curing catalyst, the epoxides provide room temperature curing reaction mixtures. Typical of such polyepoxide modifiers are the polyglycidyl polyethers of polyhydric phenols, as for example, the diglycidyl ethers, of 4,4′-dihydroxydiphenyl-2,2-propane, 4,4-dihydroxydiphenylmethane and the like and the higher polymers thereof as represented by the formula:

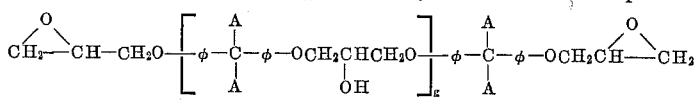

where A is hydrogen or alkyl, φ is phenylene, and g is a number representing the average chain length of the polymer, and is, for example 0 to 8 or higher. These various modifiers react with the resole resin and hence cannot be leached from the foam or lost by volatilization. The amount of such modifiers employed in this invention will depend upon the particular modifier, but in general, from 0.2 to about 50 weight percent (preferably from 2 to 20 weight percent) of the modifier based on the weight of the resole resin can be employed. Polyvinyl butyral is generally employed only in the range of from 0.2 to 5 weight percent whereas glycerol is generally employed in amounts of up to 50 weight percent.

It is preferable to employ both the above-described cross-linking compounds and modifiers in producing foamed resole resins in accordance with the practice of the present invention.

In the practice of this invention, the phenol-aldehyde resole resin liberates sufficient gases (i.e., water vapor or formaldehyde vapor) during curing to produce the desired number of cells in the foam. However, the use of the above-described cross-linking agents (e.g. isocyanates) and solvents and the like which also generate gases during curing is not undesirable and may often have the advantageous effect of seeding the formation of the gases produced by the resole resin. If desired in a particular application, additional blowing agents can be added to the reaction mixture.

The cure time and cure temperature employed in the practice of this invention in producing foamed resole resins is dependent upon the particular components of the reaction mixture and especially upon the type of curing catalyst employed. When Friedel-Crafts catalysts or hydrocarbyltrichlorosilane catalysts are employed, the mixtures generally cure in a relatively short time (e.g., from about 10 to 15 minutes) without the application of external heat. When other catalysts, such as alkali hydroxides, alkali earth hydroxides and amines are employed, curing is accomplished in somewhat longer times (e.g., from 15 to 90 minutes) by heating the mixture at a temperature from 90° C. to 140° C.

The phenol-aldehyde resole foams of this invention can, depending upon such factors as the components of the reaction mixture and the curing and foaming conditions, be rigid, semi-rigid or flexible as is apparent from the examples presented below.

The foamed products of this invention can be molded in any suitable manner. The foamable mixture can be poured into molds wherein the foam is developed by heating the mold. Open or closed molds can be used. In the latter case, the calculated amount of resin mixture is put into the mold, the mold is closed, and then heated. The amount of resin is calculated in such a manner that the resulting foam will have the predetermined apparent density. For instance, when we wish to fill a cavity of one cubic foot with a foam of the apparent density of 2 pounds per cubic foot (2 lb. ft.$^{-3}$) we have to fill two pounds of mixture into the cavity, to close it with an appropriate cover and to heat. When the resin mixture is able to form a foam of 2 lb. ft.$^{-3}$ or less, it will fill the cavity. The foamable mixture can also be filled into an open mold and allowed to rise freely or under a cover which is lifted automatically as the foam rises. When sandwiched structures are needed (e.g., foam between two plywood panels or between metal sheets or foils), the resin mixture can be applied mechanically to the one surface, then covered with the other. The whole assembly is then baked, maintaining the predetermined height of the sandwich by limiting rails or similar devices. This procedure can easily be carried out continuously conveying the resin-charged panels or sheets through a tunnel oven at an appropriate speed. Dielectric heating of the foamable mixture in a high frequency condenser field is applied. This method of heating is especially useful for continuous work, where paper, plastic, glass, wood or metals can be used as sheeting materials.

The foamed phenol-aldehyde resole resins of this invention are useful in various applications including various applications in which known organic foams are used. The foams have excellent adhesion to wood, paper and metals and are isotropic. The adhesive properties of these foams makes them particularly suited for the production of composite articles, such as panels, wherein a sheet of the foam is provided between two metal or wooden sheets for uses such as constructing insulated enclosures. The foams are useful as thermal insulating materials.

The following examples illustrate the present invention. Examples 1 and 2 illustrate the production of phenol-aldehyde resole resins suitable for use in producing foams in accordance with this invention.

*Example 1*

A mixture was formed containing 376 grams (4 moles) of crystalline phenol, 648 grams (8 moles) of formaldehyde (in the form of a 37 weight percent aqueous methanol formaldehyde solution containing 12 weight percent methanol) and 20 grams of an aqueous solution containing 50 weight percent of potassium hydroxide. The mixture was heated to 60° C. and then the heating was discontinued. The temperature of the mixture then rose spontaneously to 94° C. within 30 minutes at which time refluxing of the volatile materials in the mixture began. External heat was applied so as to continue refluxing of the volatile materials for an additional hour and then volatile materials were distilled from the reaction product at 10 millimeters of mercury pressure over a period of 40 minutes. At the end of this time the temperature of the reaction product had reached 60° C. Distillate was 450 grams of a mixture of water and methanol. The residue was 590 grams of a resole resin which was a viscous liquid that could be cured to a solid mass when heated at 105° C. for 30 minutes. This resole resin underwent a weight loss of 2.4 weight percent when heated at 105° C. for one hour and underwent a weight loss of 9.5 weight percent when heated at a temperature of 105° C. for 24 hours. A solution of 80 grams of this resole resin dissolved in 20 grams of aqueous ethanol containing 5 weight percent water had a viscosity at 25° C. of 710 centipoises.

In the following examples, the term "Siloxane I" is used to designate a siloxane-oxyalkylene copolymer having the average formula:

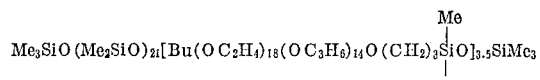

wherein "Me" denotes a methyl group and "Bu" denotes a butyl group. All the foams produced in the following examples from foamable mixtures containing Siloxane I were isotropic.

*Example 2*

Following the procedure described in Example 1, a resole resin was produced from a mixture containing 470 grams (5 moles) of crystalline phenol, 1220 grams (15 moles) of formaldehyde (in the form of a 37 weight percent aqueous formaldehyde solution) and 25 grams of aqueous potassium hydroxide solution containing 50 weight percent of potassium hydroxide. The yield of the resole resin so produced was 890 grams. The resin could be cured to a solid by heating at 105° C. for 25 minutes. The resole resin underwent a weight loss of 3.4 weight percent when heated at 150° C. for one hour and underwent a weight loss of 12 weight percent when heated at 105° C. for 25 hours. A solution containing 80 weight percent of the resole resin dissolved in aqueous ethanol containing 5 weight percent water was 385 centipoises at 25° C.

Examples 3, 4 and 5 illustrate the production of highly reactive resole resins suitable for use in this invention.

*Example 3*

A mixture was formed containing 9 grams of the resole resin produced as described in Example 1 and one gram of 3,5-xylenol. The mixture was heated at 55° C. to produce a homogeneous product which was a highly reactive resole resin that could be cured to a solid by heating at 105° C. for 15 minutes.

*Example 4*

A mixture was formed containing 9 grams of the resole resin produced as described in Example 1 and 1 gram of resorcinol. The mixture was heated until the components melted to produce a highly reactive resole resin that could be cured to a solid almost instantaneously when heated to 105° C.

*Example 5*

A mixture was formed containing 260 grams (2 mols) of m-cresol, 146 grams (1.8 mols) of formaldehyde (in a form of a solution containing 37 weight percent formaldehyde dissolved in water that contained 12 weight percent methanol) and 5 grams of ammonia in the form of a 29 weight percent aqueous ammonia solution. The mixture was refluxed for 70 minutes and the product was heated at reduced pressure for 30 minutes to remove volatile materials. The product was a resole resin similar in properties to the resin produced as described in Example 1.

Example 6 illustrates the production of a rigid foam of this invention.

*Example 6*

A mixture was formed containing 60 grams of the resole resin produced as described in Example 5, one gram of Siloxane I as a foam stabilizer and one gram of ammonium carbonate. The mixture was formed by finally dispersing the ammonium carbonate in the resole resin and then adding the Siloxane I. The mixture was then heated at 120° C. for one hour to produce a rigid foam of this invention having fine cells.

Example 7 illustrates the production of a conventional foam using an arylene diisocyanate as a cross-linking agent and Example 8 illustrates the production of a foam from a similar mixture containing a siloxane-oxyalkylene copolymer as a foam stabilizer.

*Example 7*

A mixture was formed containing 10 grams of the resole resin produced as described in Example 1 and 0.5 gram of an admixture containing 80 weight percent of 2,4-tolylene diisocyanate and 20 weight percent of 2,6-tolylene diisocyanate. The mixture was exposed to the atmosphere in a Teflon-lined cardboard mold placed in an oven at 80° C. for one hour. A very fine, friable, anisotropic and light foam was obtained.

*Example 8*

A mixture was formed containing 10 grams of the resole resin produced as described in Example 1, 0.5 gram of an admixture containing 80 weight percent of 2,4-tolylene diisocyanate and 20 weight percent of 2,6-tolylene diisocyanate and 0.1 gram of Siloxane I. The mixture was cured as described in Example 7 to produce an isotropic foam which was much less friable and which had a much more uniform cell size than a foam produced as described in Example 7. The foam produced as described in this example had a bulk or apparent density of 0.076 gram per cubic centimeter (4.6 pounds per cubic foot).

The example illustrates the inferior foam produced when siloxane-oxyalkylene copolymers are not used.

*Example 9*

A mixture was formed containing 9 grams of the resole resin produced as described in Example 1, 0.5 gram of an admixture containing 80 weight percent of 2,4-tolylene diisocyanate and 20 weight percent of 2,6-tolylene diisocyanate and 0.1 gram of phenolsilane ($C_6H_5SiH_3$). The mixture was cured by heating at 80° C. for one hour to produce a coarse foam having a bulk density of 0.064 gram per cubic centimeter (4 pounds per cubic foot).

Examples 10 and 11 illustrate the production of a foam of this invention from a reactive resorcinol-modified resole resin.

*Example 10*

A mixture was formed containing 7 grams of the resole resin produced as described in Example 1, 3 grams of a solution produced by dissolving one gram of resorcinol and 2 grams of diisopropyl ether as a solvent and 0.1 gram of Siloxane I. The mixture was cured rapidly by heating at 105° C. to produce a non-friable rigid foam having a bulk density of 0.034 gram per cubic centimeter (1.9 pounds per cubic foot). In this example the resorcinol serves as a cross-linking agent.

*Example 11*

A mixture was formed containing 7 grams of the resole resin produced as described in Example 1, one gram of resorcinol, 2 grams of a solvent mixture containing 67.6 weight percent of benzene and 32.4 weight percent of absolute ethyl and 0.1 gram of Siloxane I. The mixture was cured and foamed by heating at 120° C. for 30 minutes to produce a rigid foam having a bulk density of 0.0288 gram per cubic centimeter (1.8 pounds per cubic foot). By diluting the above mixture with acetone or methanol, its viscosity can be reduced considerably thereby rendering the mixture particularly suitable for producing foams by casting processes.

Example 12 illustrates the production of a foam using the reaction product of a polyhydroxy compound and an arylene diisocyanate as a cross-linking agent and Example 13 illustrates the improvements resulting when a siloxane-oxyalkylene copolymer is employed in producing such foams.

*Example 12*

A mixture was formed containing 7 grams of the resole resin produced as described in Example 1 and 3 grams of an isocyanate-containing reaction product produced by reacting (a) a sorbitol-started polypropylene oxide having a hydroxyl number of 490 and (b) an excess of an admixture containing 80 weight percent of 2,4-tolylene diisocyanate and 20 weight percent of 2,6-tolyene diisocyanate. The reaction product contained 20 weight percent of unreacted isocyanate groups. The mixture was cured by heating at 120° C. for 1 hour to produce a dense, fine semi-flexible foam having a bulk density of 0.197 gram per cubic centimeter (12.3 pounds per cubic foot).

*Example 13*

A mixture was formed containing 7 grams of the resole resin produced as described in Example 1, 2 grams of the isocyanate-containing reaction product described in Example 12 and 0.3 gram of Siloxane I. The mixture was cured by heating at 120° C. for 1 hour to produce a semi-flexible foam having a fine cell structure and a density of 0.140 gram per cubic centimeter (8.7 pounds per cubic foot). The low density of this foam as compared to the foam produced as described in Example 12 is attributable to the use of a siloxane-oxyalkylene copolymer as a foam stabilizer in this example.

Examples 14, 15 and 16 illustrate the use of various cross-linking compounds in the production of resole foams in accordance with the practice of this invention.

*Example 14*

A mixture was formed containing 7 grams of the resole resin produced as described in Example 1, one gram of methylethyl ketone as a cross-linking agent, 0.3 gram of Siloxane I as a foam stabilizer and 2 grams of the isocyanate-containing reaction product described in Example 12 as an additional cross-linking compound. The mixture was cured by heating at 110° C. for one hour to produce a very light rigid foam having a density of 0.016 gram per cubic centimeter (1 pound per cubic foot).

*Example 15*

A mixture was formed containg 7 grams of the resole resin produced as described in Example 1, one gram of acetone as a cross-linking agent, 0.1 gram of Siloxane I as a foam stabilizer and 1.5 grams of the isocyanate-containing reaction product described in Example 12. The mixture was cured by heating at 110° C. for one hour to produce an extremely light rigid foam.

*Example 16*

A mixture was formed containing 7 grams of the resole resin produced as described in Example 1, one gram of acetone as a cross-linking compound, 0.1 gram of Siloxane I and an admixture containing 80 weight percent of 2,4-tolylene diisocyanate and 20 weight percent of 2,6-tolylene diisocyanate. The mixture was cured by heating at 110° C. for one hour to produce a very light rigid foam having a density of 0.144 gram per cubic centimeter (0.9 pound per cubic foot).

*Example 17*

A mixture was formed containing 7 grams of the resole resin produced as described in Example 1, 3 grams of anhydroenneheptitol, 0.1 gram of Siloxane I and one gram of an admixture containing 80 weight percent of 2,4-tolylene diisocyanate and 20 weight percent of 2,6-tolylene diisocyanate. The mixture was cured by heating at 110° C. for one hour to produce a rigid foam having a very fine and uniform cell structure and having a density of 0.0273 gram per cubic centimeter (1.7 pounds per cubic foot).

Examples 18 and 19 illustrate the criticality of employing a siloxane-oxyalkylene copolymer in accordance with the practice of this invention with certain glycerol-containing resole foam compositions.

*Example 18*

A mixture was formed containing 9 grams of the resole resin produced as described in Example 1, one gram of a solution containing 95 weight percent glycerol and 5 weight percent water and 0.5 gram of the admixture containing 80 weight percent of 2,4-tolylene diisocyanate and 20 weight percent of 2,6-tolylene diisocyanate. The mixture was cured by heating at 110° C. for one hour. A bubbly resin, rather than a foam, was produced.

*Example 19*

A mixture was formed containing 9 grams of the resole resin produced as described in Example 1, one gram of a solution containing 95 weight percent glycerol and 5 weight percent water, 0.5 gram of the admixture containing 80 weight percent of 2,4-tolylene diisocyanate and 20 weight percent of 2,6-tolylene diisocyanate and 0.25 gram of Siloxane I. This mixture was cured as described in Example 18 to produce a fine and strong flexible foam having a density of 0.04 gram per cubic centimeter (2.5 pounds per cubic foot).

*Example 20*

The procedure described in Example 19 was repeated employing ethylene glycol in place of glycerol. The foam so produced had a fine cell structure and had a density of 0.4298 gram per cubic centimeter (1.86 pounds per cubic foot). The foam was semi-flexible and non-friable.

*Example 21*

A mixture was formed containing 9 grams of the resole resin produced as described in Example 1, 0.75 gram of pentaerythritol as a plasticizer, 0.25 gram of water as a reactant with isocyanate groups to produce gas, 0.50 gram of an admixture containing 80 weight percent of 2,4-tolylene diisocyanate and 20 weight percent of 2,6-tolylene diisocyanate and 0.25 gram of Siloxane I. The mixture was cured by heating at about 110° C. for about one hour to produce a rigid foam having a density of 0.0167 gram per cubic centimeter (1.04 pounds per cubic foot).

*Example 22*

A mixture was formed containing 9 grams of the resole resin produced as described in Example 1, one gram of hexanediol-2,5 as a modifier, 0.5 gram of an admixture containing 80 weight percent of 2,4-tolylene diisocyanate and 20 weight percent of 2,6-tolylene diisocyanate and 0.25 gram of Siloxane I. The mixture was cured by heating at 110° C. for about 1 hour to produce a semi-flexible foam having a density of 0.0304 gram per cubic centimeter (1.9 pounds per cubic foot).

Examples 23, 24 and 25 illustrate the production of foams of this invention having various degrees of elasticity or rigidity.

*Example 23*

A mixture was formed and cured as described in Example 22 except that hexanetriol-1,2,6 was used in place of hexanediol-2,5. A somewhat more resilient and elastic flexible foam was produced that was mechanically strong and that had a density of 0.027 gram per cubic foot (1.68 pounds per cubic foot).

*Example 24*

A foam was produced from a mixture containing a greater relative amount of hexanetriol than was employed in Example 23. That is, a mixture was formed containing 8 grams of the resole resin produced as described in Example 1, 2 grams of hexanetriol-1,2,6, 0.5 gram of an admixture containing 80 weight percent of 2,4-tolylene diisocyanate and 20 weight percent of 2,6-tolylene diisocyanate and 0.25 gram of Siloxane I. The mixture was cured for about one hour at 110° C. and then post-cured by heating at 150° C. for 20 minutes to produce a foam that was almost elastic and that had a density of 0.0338 gram per cubic centimeter (2.1 pounds per cubic foot). When a slab of this foam was compressed to half its height in a press, it recovered to its original height after removal of the load.

When the same mixture was cured by heating at 110° C. for 1.5 hours, a more rigid foam was produced that sounded like wood when dropped on a table and that had a density of 0.035 gram per cubic centimeter (2.2 pounds per cubic foot).

*Example 25*

When the mixture described in Example 22 was allowed to stand for 4 days at room temperature and then heated at 125° C. for one hour, a rigid foam was obtained having a density of 0.0216 gram per cubic centimeter (1.35 pounds per cubic foot.)

*Example 26*

A mixture was formed containing 9 grams of the resole resin produced as described in Example 1, 1 gram of neopentylglycol, 0.25 gram of Siloxane I and 0.50 gram of an admixture containing 80 weight percent of 2,4-tolylene diisocyanate and 20 weight percent of 2,6-tolylene diisocyanate. The mixture was heated for 40 minutes at 125° C. to produce a rigid foam having a density of 0.0336 gram per cubic centimeter (2.1 pounds per cubic foot).

*Example 27*

A mixture was formed containing 8.25 grams of the resole resin produced as described in Example 1, 1 gram of hexanetriol-1,2,6, 0.25 gram of Siloxane I and 0.50 gram of the admixture containing 80 weight percent of 2,4-tolylene diisocyanate and 20 weight percent of 2,6-tolylene diisocyanate. The mixture was cured by heating for one hour at 125° C. to produce a hard rigid foam having a density of 0.064 gram per cubic centimeter (4 pounds per cubic foot).

*Example 28*

A mixture was formed containing 8.25 grams of the resole resin produced as described in Example 1, 1 gram of hexanetriol-1,2,6, 0.25 gram of Siloxane I, 0.50 gram of an admixture containing 80 weight percent of 2,4-tolylene diisocyanate and 20 weight percent of 2,6-tolylene diisocyanate and 10 grams of polystyrene beads as a flame retardant. The mixture was cured by heating at 125° C. for about one hour to produce a dense and strong foam in which the expanded polystyrene spheres were imbedded in a mass of phenolic foam. The foam was rigid and had a density of 0.03 gram per cubic centimeter (1.88 pounds per cubic foot).

*Example 29*

A mixture was formed containing 5.77 grams of the resole resin produced as described in Example 1, 0.58 gram of $H_2N(C_3H_6O)_xC_3H_6NH_2$ (molecular weight 2000), 2.90 grams of hexanetriol-1,2,6, 0.25 gram of Siloxane I and 0.5 gram of an admixture containing 80 weight percent of 2,4-tolylene diisocyanate and 20 weight percent of 2,6-tolylene diisocyanate. The mixture was cured by heating at 105° C. for one hour to produce a somewhat elastic, flexible, and nonfriable foam having a density of 0.139 gram per cubic centimeter (8.7 pounds per cubic foot).

*Example 30*

A mixture was formed containing 6.5 grams of the resole resin produced as described in Example 1, 0.0325 gram of a dihydroxy end-blocked polyethylene oxide (having a viscosity from 1,500 to 3,500 centipoises at one weight percent concentration in water), 0.25 gram of the diamine used in Example 29, 2 grams of hexanetriol-1,2,6, 0.25 gram of Siloxane I and 1 gram of an admixture containing 80 weight percent of 2,4-tolylene diisocyanate and 20 weight percent of 2,6-tolylene diisocyanate. The mixture was cured by heating at 110° C. for 30 minuts to produce a somewhat elastic foam of low friability having a density of 0.032 gram per cubic centimeter (2 pounds per cubic foot).

*Example 31*

A mixture was formed containing 5 grams of the resole resin produced as described in Example 1, 0.6 gram of xylenol-3,5, 2.9 grams of hexanetriol-1,2,6, 0.25 gram of Siloxane I and 1.0 gram of an admixture containing 80 weight percent of 2,4-tolylene diisocyanate and 20 weight percent of 2,6-tolylene diisocyanate. The mixture was cured by heating at 120° C. for 30 minutes to produce a resilient foam having a density of 0.0358 gram per cubic centimeter (2.24 pounds per cubic foot).

*Example 32*

A mixture was formed containing 5 grams of the resole resin produced as described in Example 2, 0.6 gram of xylenol-3,5, 0.25 gram of the diamine used in Example 29, 2.90 grams of hexanetriol-1,2,6, 0.25 gram of Siloxane I and 1.0 gram of an admixture containing 80 weight percent of 2.4-tolylene diisocyanate and 20 weight percent of 2,6-tolylene diisocyanate. The mixture began to foam as soon as formed without the application of external heat. The curing of the foam was completed by heating the foam in an oven at 110° C. for about one hour. The flexible foam so produced had a density of 0.027 gram per cubic centimeter (1.68 pounds per cubic foot).

*Example 33*

A mixture was formed containing 8.25 grams of the resole resin produced as described in Example 2, 1.0 gram of hexanetriol-1,2,6, 0.25 gram of Siloxane I and 0.50 gram of an admixture containing 80 weight percent of 2,4-tolylene diisocyanate and 20 weight percent of 2,6-tolylene diisocyanate. The mixture was cured by heating at 110° C. for about one hour and then post-cured by heating at 150° C. for 20 minutes to produce a semi-flexible foam having a density of 0.0235 gram per cubic centimeter (1.47 pounds per cubic foot).

Example 34

A mixture was formed containing 8.25 grams of the resole resin produced as described in Example 2, 1.0 gram of hexanetriol-1,2,6, 0.5 gram of an aqueous hydrogen peroxide solution containing 30 weight percent of hydrogen peroxide as a blowing agent, 0.25 gram of Siloxane I and 0.50 gram of an admixture containing 80 weight percent of 2,4-tolylene-diisocyanate and 20 weight percent of 2,6-tolylene diisocyanate. The mixture was cured by heating at 120° C. for about one hour to produce a rigid foam having a density of 0.029 gram per cubic centimeter (1.81 pounds per cubic foot).

Example 35

A mixture was formed containing 8.25 grams of the resole resin produced as described in Example 2, 1.0 gram of hexanetriol-1,2,6, 0.25 gram of Siloxane I and 0.70 gram of diphenylmethane-4,4'-diisocyanate. The mixture was heated to melt the diisocyanate at which point the mixture began to foam. The heating was continued until the temperature of the mixture reached 120° C. at which point the heating was terminated and the mixture had been converted to an almost white, tough, rigid foam having some elasticity and little friability and having a density of 0.048 gram per cubic centimeter (3 pounds per cubic foot).

Example 36 illustrates the importance of employing a siloxane-oxyalkylene copolymer in accordance with the practice of this invention to produce a satisfactory foamed resole resin.

Example 36

A mixture was formed containing 10 grams of the resole resin produced as described ni Example 2, 6.4 grams of divinyl sulfone, 0.2 gram of pyridine and 3.0 grams of hexanetriol-1,2,6. The mixture was cured by heating at 100° C. for about one hour to produce an elastic, flexible resin which was not foamed.

Example 37

A mixture was formed containing 6 grams of the resole resin produced as described in Example 2, 0.25 gram of the diamine used in Example 29, 2.50 grams of hexanetriol-1,2,6, 0.25 gram of Siloxane I, 0.43 gram of water and 2.0 grams of an admixture containing 80 weight percent of 2,4-tolylene diisocyanate and 20 weight percent of 2,6-tolylene diisocyanate. The water was present in the reaction mixture to react with the isocyanate groups in the tolylene diisocyanates to produce carbon dioxide as an additional foaming gas. The mixture was cured by heating at 100° C. for about one hour to produce a foam having an apparent density of 0.0266 gram per cubic centimeter (1.65 pounds per cubic foot). The foam was flexible but non-elastic.

Example 38

A mixture was formed containing 6 grams of the resole resin produced as described in Example 2, 0.25 gram of the diamine used in Example 29, 2.50 grams of hexanetriol-1,2,6, 0.25 gram of Siloxane I, 0.21 gram of an aqueous potassium hydroxide solution containing 50 weight percent of potassium hydroxide and 1 gram of an admixture containing 80 weight percent of 2,4-tolylene diisocyanate and 20 weight percent of 2,6-tolylene diisocyanate. The potassium hydroxide was used to accelerate the cure of the mixture. The mixture was cured by heating at 100° C. for about 0.5 hour to produce a flexible and non-elastic foam having an apparent density of 0.029 gram per cubic centimeter (1.8 pounds per cubic foot).

Example 39

A mixture was formed containing 6 grams of the resole resin produced as described in Example 2, 0.25 gram of the diamine used in Example 29, 2.50 grams of hexanetriol-1,2,6, 0.25 gram of Siloxane I, 0.05 gram of ammonium bicarbonatae as an additional blowing agent and 2.0 grams of an admixture containing 80 weight percent of 2,4-tolylene diisocyanate and 20 weight percent of 2,6-tolylene diisocyanate. The mixture foamed immediately upon mixing and cured without the application of external heat to produce a flexible and non-elastic foam.

Example 40

A mixture was formed containing 6 grams of the resole resin produced as described in Example 2, 1 gram of hexanetriol, 1 gram of an aqueous ethylene diamine carbonate solution containing 25 weight percent of ethylene diamine carbonate, 0.25 gram of Siloxane I and 1.0 gram of an admixture containing 80 weight percent of 2,4-tolylene diisocyanate and 20 weight percent of 2,6-tolylene diisocyanate. The mixture foamed at room temperature and was cured by heating at 100° C. for 1 hour to produce a rigid foam.

Example 41

A mixture was formed containing 5 grams of the resole resin produced as described in Example 2, 5 grams of the diglycidyl ether of bisphenol A, 0.25 gram of Siloxane I, 0.25 gram of the diamine used in Example 29, and 1.0 gram of diethylenetriamine carbonate. The mixture foamed at room temperature to produce a stiff foam which was post-cured by heating at 100° C. for about one hour. The post-cured foam was particularly strong.

Example 42 illustrates the production of a phenol-aldehyde resole resin that is suitable for use in this invention by reacting bisphenol A and formaldehyde.

Example 42

A mixture was formed containing 0.5 mole (114 grams) of bisphenol A, 2 moles (163 grams) of an aqueous formaldehyde solution containing 37 weight percent formaldehyde and 12 weight percent methanol, and 5 grams of an aqueous potassium hydroxide solution containing 50 weight percent of potassium hydroxide. The mixture was heated at reflux for 45 minutes and the product so produced was vacuum distilled by heating the product until its temperature reached 50° C. while maintaining it under a vacuum and withdrawing the materials volatilized from the product. The residue so produced (174 grams) was a resole resin suitable for use in producing foams in accordance with the practice of this invention.

Example 43 illustrates the production of a foam in accordance with the practice of this invention from a resole resin made from bisphenol A and formaldehyde.

Example 43

A mixture was formed containing 8 grams of the bisphenol A-formaldehyde resole resin produced as described in Example 42, 8.5 grams of the phenol-formaldehyde resole resin produced as described in Example 1, 2.0 grams of glycerol containing 1 weight percent water, 0.5 gram of Siloxane I and 1.0 gram of an admixture containing 80 weight percent of 2,4-tolylene diisocyanate and 20 weight percent of 2,6-tolylene diisocyanate. The various components of the mixture, excluding the admixture of diisocyanates, were preblended at 60° C. in order to melt the resole resin of Example 42. The preblend so produced was thoroughly mixed, the admixture of tolylene diisocyanates was added thereto and the resulting mixture was cured by heating at 105° C. for 2.5 hours to produce a strong, rigid, almost white foam having a density of 0.0352 gram per cubic centimeter (2.2 pounds per cubic foot).

Examples 44 and 45 illustrate the use of hydrocarbyl trihalosilanes as room temperature curing catalysts in producing foams in accordance with the present invention.

*Example 44*

A mixture was formed containing 41.25 grams of the resole resin produced as described in Example 1, 5.0 grams of glycerol containing 1 weight percent water, 1.25 grams of Siloxane I, 2.50 grams of an admixture containing 80 weight percent of 2,4-tolylene diisocyanate and 20 weight percent of 2,6-tolylene diisocyanate and 2.5 grams of a solution composed of 50 weight percent of nonyltrichlorosilane and 50 grams of diisopropyl ether. Three minutes after the above components had been mixed, the mixture began to foam and it set to a rubbery mass after about 7 minutes without the application of external heat. After standing for an additional 15 minutes without the application of external heat, the rubbery mass had cured to a strong, hard and rigid foam having very fine pores. When slices of this foam were immersed in water for 24 hours, the water was found to have a pH of 2.9.

*Example 45*

When amyltrichlorosilane was substituted for nonyltrichlorosilane in the reaction mixture described in Example 44 substantially the same results were obtained.

Example 46 illustrates the use of a novolac resin as an additive to add greater strength to foamed resole resins produced in accordance with the practice of this invention.

*Example 46*

A mixture was formed containing 8.5 grams of the resole resin produced as described in Example 1, 8.0 grams of an epoxidized novolac resin (sold under the name ERNA–0447 by the Union Carbide Corporation), 2.0 grams of glycerol containing 1 weight percent water, 0.5 gram of Siloxane I, 0.2 gram of diethylenetriamine and 1.0 gram of an admixture containing 80 weight percent of 2,4-tolylene diisocyanate and 20 weight percent of 2,6-tolylene diisocyanate. The mixture was cured by heating at 95° C. for 3 hours to produce a rigid foam having very fine pores and having an apparent density of 0.0604 gram per cubic centimeter (3.77 pounds per cubic foot).

The properties of the foamed resole resins of this invention can often be improved even further by post-curing the foamed resole resin. Post-curing is conveniently conducted by heating the cured foam at a temperature from 80° C. to 100° C. for a period from 1 to 3 hours. Alternatively, if the cured foamed resole resin is simply allowed to stand or age at atmospheric conditions, a further improvement in the physical properties thereof is often noted.

As indicated in the above, the foamed resole resins of this invention are isotropic and, depending upon the specific reactants and/or foaming conditions employed, possesses other desirable properties. The effectiveness of the above-defined siloxane-oxyalkylene copolymers producing such foams is surprising since seemingly analogous siloxane-oxyalkylene copolymers wherein the siloxane moiety is linked to the oxyalkylene moiety by a silicon to oxygen to carbon bond, which are effective in producing foamed novolac resins, cannot be employed with any great success in producing isotropic foamed resole resins. Moreover, these seemingly analogous siloxane-oxyalkylene copolymers wherein the moieties are linked by a silicon to oxygen to carbon bond fail to produce the uniform cell structure produced with the copolymers employed in this invention and, in addition, the former copolymers tend to decompose when subjected to the non-neutral curing conditions often employed to cure the foams of this invention.

A remarkable property of the foamed resole resins of this invention is their isotropic nature. Without tending to be bound by any particular theory, it appears that the isotropic nature of the foamed resole resins is due to the geometry of the cells in the foam. These cells were found to be predominantly polyhedra, of the isometric type, usually pentagon dodecahedra. The isotropic nature of the foam seems to be due to the fact that the axes of the individual cells are equal. When other foam stabilizers are used in lieu of the copolymers employed as foam stabilizers in this invention, elongated cells (e.g., cylindrical cells) are produced having longer axes in the direction of cell growth with the result that the mechanical properties of the foam when measured parallel to these longer axes are different from mechanical properties measured perpendicular to these axes (i.e., such foams are anisotropic). In view of the isotropic nature of the foams of this invention no precautions need be taken to orient the foams prior to use, e.g., as load supporting members.

The uniformity of cell size in the foams of this invention can be improved even further by employing fluorocarbon blowing agents such as the freons. The formation of closed cells is promoted by the use of the above-described arylene diisocyanates as crosslinking agents. These diisocyanates also increase the strength and further decrease the friability of the foam. The effectiveness of the copolymers used as stabilizers in foamable mixtures containing such diisocyanates is surprising since other stabilizers (e.g., ethanolamine and morpholine) are ineffective in producing satisfactory foams from mixtures containing such diisocyanates.

Other advantageous properties of the foams of this invention are their degree of rigidity which can be varied from flexible to hard, depending upon the particular reactants employed as is apparent from the foregoing examples. Another advantage of the foams of this invention is their good dimension stability, particularly when exposed to moderately elevated temperature (e.g., 70° C.) at high relative humidity (e.g., 100 percent relative humidity). Aging of the foams at atmospheric conditions enhance the dimensional stability thereof. A further advantage of the foams of this invention is their ability to stop burning when withdrawn from a flame. This latter property is an improvement over known phenolic foams which smolder or "punk" when removed from a flame. Fillers, such as antimony oxide and silica, can be incorporated into the foamable mixtures in order to further improve this property of the foams.

The foamed phenolic resins of this invention, as distinguished from prior foamed phenolic resins, can be produced free of acidic materials (e.g., acidic curing catalysts). These non-acidic foams of this invention are especially desirable where a foamed phenolic resin which will be employed in intimate contact with a metallic surface is needed (e.g., as a packaging material for electrical apparatus). Of course, acidic curing catalysts (e.g., hydrochloric acid, sulfuric acid, toluene sulfonic acid, phosphoric acid and the like) can be employed as desired in a particular application.

The cured foamed resole resins of this invention are in the resit or "C" stage of polymerization.

As used herein "flexible" denotes somewhat pliable and deformable rather than elastomeric or spongy.

What is claimed is:

1. A mixture suitable for use in producing a foamed phenol-aldehyde resole resin, said mixture comprising:
   (A) a phenol aldehyde resole resin and
   (B) a siloxane-oxyalkylene copolymer as foam stabilizer for the foamed phenol-aldehyde resole resin, said copolymer consisting essentially of (a) at least one siloxane chain consisting essentially of at least two siloxane units represented by the formula:

$$R_b SiO_{\frac{4-b}{2}}$$

wherein R is a member selected from the group consisting of the monovalent hydrocarbon groups, the divalent hydrocarbon groups, the hydroxy-substituted divalent hydrocarbon groups and the divalent hydrocarbon groups linked to carbonyl groups and b has a value from 1 to 3 inclusive, said siloxane chain containing at least one of said siloxane units wherein at least one R group is a divalent group, as defined above which links the siloxane chain to an oxyalkylene chain as defined below by a carbon to silicon bond, and (b) at least one oxyalkylene chain consisting essentially of at least one oxyalkylene group represented by the formula —R'O—, wherein R' is an alkylene group, said copolymer being present in the mixture in an amount of from 1 part to 10 parts by weight per 100 parts by weight of the resole resin.

2. The mixture of claim 1 wherein the siloxane-oxyalkylene copolymer has the average formula:

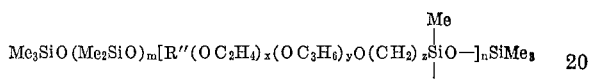

wherein $m$ has a value from 3 to 25 inclusive, $n$ has a value from 2 to 10 inclusive, $x$ has a value from 4 to 25 inclusive, $y$ has a value from 0 to 25 inclusive, $z$ has a value from 2 to 3 inclusive and R'' is an alkyl group containing from 1 to 4 carbon atoms inclusive.

3. A process for producing a foamed phenolaldehyde resole foam which process comprises foaming and curing a mixture comprising:
(A) a phenol-aldehyde resole resin and
(B) a siloxane-oxyalkylene copolymer as foam stabilizer for the foamed phenol-aldehyde resole resin, said copolymer consisting essentially of (a) at least one siloxane chain consisting essentially of at least two siloxane units represented by the formula:

wherein R is a member selected from the group consisting of the monovalent hydrocarbon groups, the divalent hydrocarbon groups, the hydroxy-substituted divalent hydrocarbon groups and the divalent hydrocarbon groups linked to carbonyl groups and b has a value from 1 to 3 inclusive, said siloxane chain containing at least one of said siloxane units wherein at least one R group is a divalent group, as defined above which links the siloxane chain to an oxyalkylene chain as defined below by a carbon to silicon bond, and (b) at least one oxyalkylene chain consisting essentially of at least one oxyalkylene group represented by the formula —R'O—, wherein R' is an alkylene group, said copolymer being present in the mixture in an amount of from 1 part to 10 parts by weight per 100 parts by weight of the resole resin.

4. The process of claim 3 wherein the siloxane-oxyalkylene copolymer has the average formula:

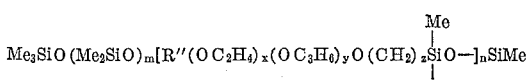

wherein $m$ has a value from 3 to 35 inclusive, $n$ has a value from 2 to 10 inclusive, $x$ has a value from 4 to 25 inclusive, $y$ has a value from 0 to 25 inclusive, $z$ has a value from 2 to 3 inclusive and R'' is an alkyl group containing from 1 to 4 carbon atoms inclusive.

5. A process for producing a foamed phenol-aldehyde resole resin which comprises foaming and curing a mixture comprising:
(A) a phenol-aldehyde resole resin,
(B) a siloxane-oxyalkylene copolymer as defined in claim 1 in an amount of from 1 to 10 parts by weight per 100 parts by weight of the resole resin and
(C) a crosslinking compound selected from the group consisting of:
(1) arylene diisocyanates; and
(2) polyisocyanate-containing reaction products of arylene diisocyanates and dihydroxyl end-blocked polyalkyleneoxides;
said crosslinking compound being present in an amount of from 0.2 part to 10 parts by weight per 100 parts by weight of the resole resin.

6. A process for producing a foamed phenol-aldehyde resole resin which comprises foaming and curing a mixture comprising:
(A) a phenol-aldehyde resole resin;
(B) a siloxane-oxyalkylene copolymer as defined in claim 1 in an amount from 1 to 10 parts by weight per 100 parts by weight of the resole resin and
(C) a modifier selected from the group consisting of:
(1) polyamines;
(2) hydrocarbyl diols;
(3) hydrocarbyl triols;
(4) monohydric alkenyl alcohols;
(5) polyvinyl pyrrolidone;
(6) polyvinyl formal;
(7) polyvinyl butyral;
(8) hydroxycellulose; and
(9) the diglycidyl ethers of bisphenols, said modifier being present in the mixture in an amount of from 0.2 part to 50 parts by weight per 100 parts by weight of the resole resin.

7. A process for producing a foamed phenol-aldehyde resole resin which comprises foaming and curing a mixture comprising:
(A) a phenol-aldehyde resole resin,
(B) a siloxane-oxyalkylene copolymer as defined in claim 1 in an amount of from 1 to 10 parts by weight per 100 parts by weight of the resole resin and
(C) a crosslinking compound selected from the group consisting of:
(1) arylene diisocyanates; and
(2) polyisocyanate-containing reaction products of arylene diisocyanates and dihydroxyl end-blocked polyalkylene-oxides;
said crosslinking compound being present in an amount of from 0.2 parts to 10 parts by weight per 100 parts by weight of the resole resin.
(D) a modifier selected from the group consisting of:
(1) polyamines;
(2) hydrocarbyl diols;
(3) hydrocarbyl triols;
(4) monohydric alkenyl alcohols;
(5) polyvinyl pyrrolidone;
(6) polyvinyl formal;
(7) polyvinyl butyral;
(8) hydroxycellulose; and
(9) the diglycidyl ethers of bisphenols, said modifier being present in the mixture in an amount of from 0.2 part to 50 parts by weight per 100 parts by weight of the resole resin.

8. The process of claim 3 wherein a catalytic amount of a hydrocarbyltrichlorosilane is employed as a curing catalyst.

9. The process of claim 7 wherein the resole resin is a liquid phenol-formaldehyde resole resin; the siloxane-oxyalkylene copolymer has the average formula:

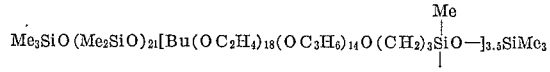

hexanetriol-1,2,6 is the modifier and a tolylene diisocyanate is the crosslinking compound.

10. A foamed resole resin produced by the process of claim 3.

11. A foamed resole resin produced by the process of claim 4.

12. A foamed resole resin produced by the process of claim 5.

13. A foamed resole resin produced by the process of claim 6.

14. A foamed resole resin produced by the process of claim 7.

15. A foamed resole resin produced by the process of claim 8.

16. A foamed resole resin produced by the process of claim 9.

17. The process of claim 3 conducted in the absence of any acidic resole resin curing catalyst.

18. The product of the process of claim 17.

References Cited by the Examiner

UNITED STATES PATENTS

| | | | |
|---|---|---|---|
| 2,608,536 | 8/1952 | Sterling | 260—2.5 |
| 2,629,698 | 2/1953 | Sterling | 260—2.5 |
| 2,653,139 | 9/1953 | Sterling | 260—2.5 |
| 2,846,458 | 8/1958 | Haluska | 260—46.5 |
| 2,933,461 | 4/1960 | Mullen | 260—2.5 |
| 2,993,871 | 7/1961 | Shannon et al. | 260—2.5 |
| 3,081,269 | 3/1963 | Shannon et al. | 260—2.5 |

SAMUEL H. BLECH, *Primary Examiner.*

MURRAY TILLMAN, *Examiner.*

M. FOELAK, *Assistant Examiner.*